US012151491B2

(12) United States Patent
Gundale et al.

(10) Patent No.: US 12,151,491 B2
(45) Date of Patent: Nov. 26, 2024

(54) EDGE DETACKIFICATION AND DECORATION OF ADHESIVE TAPE ROLLS

(71) Applicant: 3M INNOVATIVE PROPERTIES COMPANY, St. Paul, MN (US)

(72) Inventors: Jeremy P. Gundale, Woodbury, MN (US); Matthew T. Holbrook, Little Canada, MN (US)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 738 days.

(21) Appl. No.: 17/252,347

(22) PCT Filed: Jun. 24, 2019

(86) PCT No.: PCT/IB2019/055304
§ 371 (c)(1),
(2) Date: Dec. 15, 2020

(87) PCT Pub. No.: WO2020/003098
PCT Pub. Date: Jan. 2, 2020

(65) Prior Publication Data
US 2021/0260891 A1    Aug. 26, 2021

Related U.S. Application Data

(60) Provisional application No. 62/690,054, filed on Jun. 26, 2018.

(51) Int. Cl.
*B41J 3/407* (2006.01)
*B41J 2/01* (2006.01)
(Continued)

(52) U.S. Cl.
CPC .................. *B41J 3/407* (2013.01); *B41J 2/01* (2013.01); *B41J 11/00214* (2021.01);
(Continued)

(58) Field of Classification Search
CPC ........ B41J 3/407; B41J 2/01; B41J 11/00214; B41M 3/008; B41M 2205/34;
(Continued)

(56) References Cited

U.S. PATENT DOCUMENTS 9,683,137 B2    6/2017   De Boer
2001/0031353 A1   10/2001  Hannington
(Continued)

FOREIGN PATENT DOCUMENTS

JP    4717267        7/2011
JP    2015136901 A  *  7/2015   .............. B41J 15/06
(Continued)

OTHER PUBLICATIONS

Machine English translation of JP-2015136901-A; Kuzuhara, I (Year: 2015).*
"PUL244851 UV Clear w/Blue Fluorescence", Safety Data Sheet, Kao Collins, Revision No. 1, 2015, pp. 01-08.
(Continued)

*Primary Examiner* — Jessica M Roswell
(74) *Attorney, Agent, or Firm* — Vincent Pham

(57) ABSTRACT

Adhesive tape rolls having detackified side faces are presented, and methods of their manufacture. In one embodiment, the method comprises applying one or more inks to a side face of an adhesive tape roll with an ink jet printing system. In some embodiments, inks are applied in an imagewise manner so as to create a pattern, text or graphics, which may include: barcodes. QR codes, brand information, manufacturing information, or remaining roll quantity indicia. In one aspect, the present methods enable elimination of packaging materials by two concurrent advantages: a) detackifying the side faces, which eliminates the need for packaging materials to prevent blocking of stacked rolls and accumulation of debris on side faces; and b) producing an adhesive tape roll bearing text, graphics, or other information on the
(Continued)

side face of the roll, which eliminates the need for packaging materials to bear such information.

10 Claims, 1 Drawing Sheet

(51) Int. Cl.
*B41J 11/00* (2006.01)
*B41M 3/00* (2006.01)
*C09D 11/101* (2014.01)
*C09D 11/107* (2014.01)

(52) U.S. Cl.
CPC ........... *B41M 3/008* (2013.01); *C09D 11/101* (2013.01); *C09D 11/107* (2013.01); *B41M 2205/34* (2013.01)

(58) Field of Classification Search
CPC ................. C09D 11/101; C09D 11/107; C09J 2301/416; C09J 7/00
See application file for complete search history.

(56) References Cited

U.S. PATENT DOCUMENTS

| 2002/0132078 | A1  | 9/2002  | Wong |
|---|---|---|---|
| 2002/0168514 | A1* | 11/2002 | Wright ........................ C09J 7/20 |
|  |  |  | 156/332 |
| 2008/0220251 | A1* | 9/2008  | Takaki .................... A61L 15/58 |
|  |  |  | 528/367 |
| 2018/0009002 | A1  | 1/2018  | Bendeich |
| 2018/0134476 | A1* | 5/2018  | Rosenzweig ........... B32B 27/10 |

FOREIGN PATENT DOCUMENTS

| WO | WO 2002-074875 | 9/2002 |
| WO | WO 2008-095653 | 8/2008 |
| WO | WO 2013-039737 | 3/2013 |
| WO | WO 2018-010930 | 1/2018 |

OTHER PUBLICATIONS

International Search Report for PCT International Application No. PCT/IB2019/055304, mailed on Dec. 12, 2019, 4 pages.

* cited by examiner

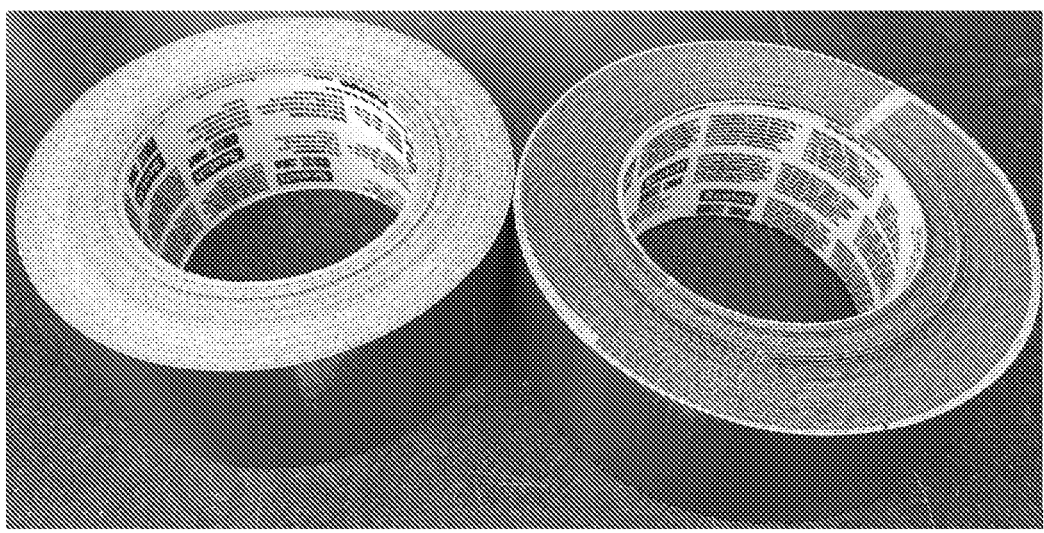

EDGE DETACKIFICATION AND DECORATION OF ADHESIVE TAPE ROLLS

FIELD OF THE DISCLOSURE

This disclosure relates to rolls of adhesive tape having detackified side faces, which may improve handling by reducing adhesion between adjacent rolls and may reduce unwanted adhesion of the side faces to tools, debris, packaging, or the like. Methods of their manufacture are also provided. In some embodiments, the rolls of adhesive tape may also bear graphics or a distinctive color scheme on the detackified side faces, which may be imparted concurrent with edge detackification by use of the present methods.

BACKGROUND OF THE DISCLOSURE

Rolls of adhesive tape are known to exhibit undesirable behavior in which side faces of the roll, comprising side edges of the adhesive tape, stick to adjacent surfaces or cause rolls to "block" or adhere together. This may lead to difficulty in roll handling, particularly by automated equipment, unwanted adhesion to packaging, and/or collection of debris, dirt, or dust. The collection of debris, dirt or dust is particularly undesirable in applications where the tape edge is exposed after installation and throughout its service life, such as, for example, in glazing applications. This problem has been addressed in a number of ways, which, however, may pose additional problems of their own. In one approach, wafers of release-coated liner are placed on the ends of the tape roll. Wafers only work while in contact with the tape roll, so once the roll has been removed from the packaging it may adhere to surfaces on which it is placed as well as pick up debris from the environment. Wafers may also cause issues in automated packaging equipment during manipulation. In addition, the wafers themselves require removal and disposal by the customer. In another approach, fine solid particles such as talc or glass beads are dusted on the side faces of the roll. However, the particles may be slowly engulfed by the adhesive and lose effectiveness over time, particularly when heated to temperatures that cause the adhesive to flow. The particles may also come loose from the roll, posing contamination issues. In another approach, individual rolls are shrink-wrapped in a packaging film. Shrink wrapping is costly, time consuming, and requires removal and disposal by the customer.

Other approaches include overcuring the side faces by radiation, such that the adhesive at the side faces is no longer tacky, and applying certain coatings through certain traditional coating methods. However, contact coating methods, such as gravure printing, flexographic, screen printing, and the like, may perform poorly with uneven surfaces such as presented by tape rolls, particularly those that are not wound with flat edges, are prone to "telescoping", or have protruding cores. Other non-contact methods, such as spray coating, may result in overspray and contamination of outer tape surfaces of the roll and lack the ability to add graphics.

The following references may be relevant to the general field of technology of the present disclosure: JP 4717267; US 2001/031353; US 2002/132078; U.S. Pat. No. 9,683,137; WO 2002/074875; WO 2008/095653; and WO 2013/039737.

SUMMARY OF THE DISCLOSURE

Briefly, the present disclosure provides methods of making an adhesive tape roll having a detackified side face by means of non-contact printing methods, including, for example, ink jet printing. In one embodiment, the method comprises the steps of: a) providing an adhesive tape roll having first and second side faces; b) providing an ink jet printing system; and c) applying one or more first inks to at least a portion of the first side face of the adhesive tape roll with the ink jet printing system. The methods may additionally comprise the step of: d) curing the first ink(s) on the first side face. In addition, the methods may additionally comprise the step of: e) applying one or more second inks to the second side face of the adhesive tape roll with the ink jet printing system, and f) curing the second ink(s) on the second side face. In some embodiments, curing may be accomplished by exposure to light in the UV to blue wavelength range, and curing may occur swiftly after application of ink, such as within 10 seconds. In some embodiments, the one or more first inks are UV cure ink jet inks having a viscosity at application temperature of between 0.1 and 30.0 centipoise. In some embodiments, the one or more first inks comprise at least two inks that differ in opacity or color. In some embodiments, inks are applied in an image-wise manner so as to create a pattern, text or graphics which, in various embodiments, may include one or more of: barcodes, QR codes, brand information, manufacturing information, or remaining roll quantity indicia. Additional embodiments of the methods of the present disclosure are described below under "Detailed Description" and "Selected Embodiments."

In another aspect, the present disclosure provides adhesive tape rolls bearing a first layer of cured ink on a first side face of the adhesive tape roll. In some embodiments, the first layer of cured ink comprises cured UV cure ink jet inks which are acrylate inks. In some embodiments, the first layer of cured ink comprises at least two inks that differ in opacity or color. In some embodiments, the first layer of cured ink comprises text or graphics, which may include, in various embodiments, one or more of: barcodes, QR codes, brand information, manufacturing information, or remaining roll quantity indicia.

Additional embodiments of the adhesive tape rolls of the present disclosure are described below under "Detailed Description" and "Selected Embodiments."

The preceding summary of the present disclosure is not intended to describe each embodiment of the present invention. The details of one or more embodiments of the invention are also set forth in the description below. Other features, objects, and advantages of the invention will be apparent from the description and from the claims.

In this application:

"directly bound" refers to two materials that are in direct contact with each other and bound together; and "image-wise" means containing contrasts in density, brightness, or color which form an image that may include text, graphics, or photographic images.

All scientific and technical terms used herein have meanings commonly used in the art unless otherwise specified.

As used in this specification and the appended claims, the singular forms "a", "an", and "the" encompass embodiments having plural referents, unless the content clearly dictates otherwise.

As used in this specification and the appended claims, the term "or" is generally employed in its sense including "and/or" unless the content clearly dictates otherwise.

As used herein, "have", "having", "include", "including", "comprise", "comprising" or the like are used in their open-ended sense, and generally mean "including, but not limited to." It will be understood that the terms "consisting of" and "consisting essentially of" are subsumed in the term "comprising," and the like.

BRIEF DESCRIPTION OF THE DRAWING

The FIGURE is a photograph of a tape roll where the visible side face was treated according to one embodiment of the present disclosure, as described in Example 2 (on the right); and an untreated tape roll of the same type, as described in Comparative Example 2 (on the left).

DETAILED DESCRIPTION

The present disclosure provides rolls of adhesive tape having detackified side faces, which may improve handling by reducing adhesion between adjacent rolls and reducing unwanted adhesion to tools or debris. Methods of their manufacture are also provided. In some embodiments, the rolls of adhesive tape may also bear graphics or a distinctive color scheme on the detackified side faces, which may be imparted concurrent with edge detackification by use of the present methods.

Adhesive tape rolls are typically wound around a core, although they may also be wound without a core. Winding of the tape into a roll produces first and second side faces, comprising first and second side edges of consecutive wraps of the adhesive tape around the roll. Each side face extends radially from the core or center of the roll to the outer edge comprising the last wrap of tape. While the two side faces would ideally be planar, and plane-parallel to each other, in reality they deviate from planarity and present an uneven surface in ways that make contact printing or contact coating methods ineffective. Uneven side face surfaces may result from wrap-to-wrap roughness, uneven wrapping, protruding wraps, protruding backing or adhesive layers of the tape, telescoping, protruding cores, and other causes.

Any suitable rolls of adhesive tape may be used in the practice of the present disclosure. The adhesive tapes comprising the rolls typically comprise at least one layer of a tacky adhesive such as a pressure sensitive adhesive. The adhesive tapes may comprise one or more layers of backing material. The adhesive tapes may be single-sided or double-sided, i.e., bearing adhesive on one side of a backing or both sides. Alternately, the adhesive tapes may be transfer tapes with no backing material. The rolls of adhesive tape may include removable liner layers or may be without liner layers. The adhesive tapes may comprise any suitable adhesive layers, which may include natural or synthetic rubber, acrylate, silicone, polyurethane, or other materials commonly used in adhesives, or combinations thereof; and may comprise one or more tackifiers or be without tackifiers. The adhesive tapes may comprise any suitable backing layers, which may include films, foams, foils, woven fabrics, non-woven fabrics, papers, or the like, or composites of any of the above, or other combinations thereof. Backing layer materials may comprise polymers such as polyolefins, polyesters, polyurethanes, polyacrylates, polyamides, natural or synthetic rubbers, polytetrafluoroethylene or other fluoropolymers, natural fibers, ceramic or glass fibers or particles, metals, or the like, or combinations thereof. Suitable rolls of adhesive tape may be wrapped around a core or may be coreless. Suitable rolls of adhesive tape typically comprise at least three wraps of tape, but may comprise at least 10, at least 30, or at least 100 wraps of adhesive tape.

Any suitable inks may be used in the practice of the present disclosure. Radiation-curable ink jet inks may be used. In some embodiments, the radiation-curable ink jet inks comprise acrylic monomers and one or more cure initiators or cure accelerators, which may be such that are activated by exposure to radiation such as UV light. In some embodiments, the inks comprise essentially no common aqueous or organic solvents (i.e., <5 wt %, <3 wt %, <1 wt %, <0.5 wt %, <0.1 wt %, or 0.0 wt %), excluding the reactive components of the ink. In some embodiments, the inks comprise essentially no VOC's (i.e., <5 wt %, <3 wt %, <1 wt %, <0.5 wt %, <0.1 wt %, or 0.0 wt %). In some embodiments, the inks have a viscosity at application temperature of between 0.1 and 30.0 centipoise. In some such embodiments, the inks have a viscosity at application temperature of not more than 25.0 centipoise, not more than 20.0 centipoise, not more than 17.0 centipoise, or not more than 15.0 centipoise. In some such embodiments, the inks have a viscosity at application temperature of at least 0.5 centipoise, at least 1.0 centipoise, at least 2.0 centipoise, at least 5.0 centipoise, or at least 10.0 centipoise. Ink jet printing application temperatures can range from room temperature to 125° C., however a more typical range is 40-70° C. For the purpose of determining the viscosity of inks described herein, a nominal application temperature of 55° C. may be taken as the application temperature. In some embodiments the inks may be optically clear. In some such embodiments, the inks may comprise fluorescent moieties that allow an operator to check for ink coverage by activating the fluorescence. In some embodiments the inks are not optically clear. In some embodiments the inks are optically translucent. In some embodiments the inks are optically opaque in the thickness applied to an adhesive tape roll side face. In some embodiments the inks comprise colorants. In some embodiments the inks comprise dyes. In some embodiments the inks comprise pigments. In some embodiments the inks have a chromatic color, i.e., a color other than white, grey or black. Inks are chosen so as to adhere to the adhesive of the adhesive tape of the adhesive tape roll, and may also adhere to the edges of the backing, if present, of the adhesive tape of the adhesive tape roll.

Any suitable non-contact printing method may be used in the practice of the present disclosure. In some embodiments, an ink jet printing system is used. In some embodiments, the ink jet printing system is a "drop on demand" system. Applicants believe that the use of an ink jet printing system enables coating and in some cases image-wise printing of the uneven surfaces which may be presented by tape rolls, particularly those that are not wound with flat edges, that are prone to "telescoping", or have protruding cores, since ink jet printing systems do not require contact with the substrate and may tolerate a substantial gap between print head and substrate. In addition, Applicants believe that the use of an ink jet printing system avoids over-spray that may occur with spray systems, which can contaminate the outermost wrap of the tape roll as well as processing equipment. In some embodiments, the ink jet printing system may be adapted to deliver a single ink. In some embodiments, the ink jet printing system may be adapted to deliver two or more inks. In some embodiments, the ink jet printing system may be adapted to deliver full color imaging, which may include delivery of three, four, five, six, seven, or eight separate inks.

In some embodiments of the present disclosure, an adhesive tape roll is treated on both side faces. In some embodiments, an adhesive tape roll is treated on only one side face.

In some embodiments of the present disclosure, an adhesive tape roll is subjected to one or more pretreatments to aid adhesion of the ink. Such pretreatments may include corona, plasma, or flame treatments.

After deposition of the ink on the tape roll side face, the ink is typically cured. In some embodiments, the ink is radiation cured. In some embodiments, the ink is cured with light in the UV to blue range. In some embodiments, the ink is cured with UV light having a wavelength of 245 nanometers to 405 nanometers. Any suitable light source may be used, which may include mercury arc lamps or LED's. In some embodiments, radiation cure is carried out under ambient atmosphere, whereas in other embodiments, radiation cure may be carried out under an inert atmosphere, e.g., nitrogen. In some embodiments, radiation cure commences shortly after application of the ink; in some embodiments, less than 10 minutes, in some less than 5 minutes, in some less than 3 minutes, in some less than 2 minutes, in some less than 1 minute, in some less than 30 seconds, in some less than 20 seconds, in some less than 10 seconds, in some less than 5.0 seconds, in some less than 1.0 seconds, in some less than 0.5 seconds, and in some embodiments radiation cure commences in less than 0.2 seconds after application of the ink. In some embodiments, quick cure can prevent a low viscosity ink from seeping into the adhesive tape roll. Applicants note that the radiation exposure needed to cure radiation curable inks is far less than needed in the overcure method of detackification, where the side faces are treated with radiation alone to overcure the adhesive at its edge until it is no longer tacky. The radiation exposure needed to cure radiation curable inks is typically less than 10% of that needed in the overcure method, and may be less than 5% or less than 1% of that needed in the overcure method.

In some embodiments, the ink may be applied to the side face of the roll in multiple passes. The multiple passes may be applied from a single printing apparatus or two or more printing apparatus. In one such embodiment, a clear layer is applied to the entire side face in a first pass and graphics are applied in a second pass. In some such embodiments, no radiation cure occurs until after the last pass. In some such embodiments, radiation cure occurs after each pass. In some such embodiments, an incomplete radiation cure occurs after each pass except the last, which is followed by complete radiation cure.

In some embodiments, the cured print layer on the side face of the adhesive roll has a thickness of 10-50 microns. In some such embodiments, the cured print layer has a thickness of at least 15 microns, at least 20 microns, or at least 25 microns. In some such embodiments, the cured print layer has a thickness of less than 45 microns, less than 40 microns, or less than 35 microns. In some embodiments, the ink is applied at a rate of 1-50 milliliters/square meter. In some such embodiments, the ink is applied at a rate of at least 5 milliliters/square meter or at least 10 milliliters/square meter. In some such embodiments, the ink is applied at a rate of less than 40 milliliters/square meter, less than 30 milliliters/square meter, or less than 20 milliliters/square meter. In some embodiments, the ink is applied at a density of 1-50 grams/square meter. In some such embodiments, the ink is applied at a density of at least 5 grams/square meter or at least 10 grams/square meter. In some such embodiments, the ink is applied at a density of less than 40 grams/square meter, less than 30 grams/square meter, or less than 20 grams/square meter.

In some embodiments, the cured print layer on the side face of the adhesive roll covers at least 20% of the area of the side face, in some embodiments at least 30% of the area of the side face, in some embodiments at least 40% of the area of the side face, in some embodiments at least 50% of the area of the side face, in some embodiments at least 60% of the area of the side face, in some embodiments at least 70% of the area of the side face, in some embodiments at least 80% of the area of the side face, in some embodiments at least 85% of the area of the side face, in some embodiments at least 90% of the area of the side face, and in some embodiments the cured print layer on the side face of the adhesive roll covers at least 95% of the area of the side face.

In some embodiments, the cured print layer on the side face of the adhesive roll is a clear layer. In some embodiments, the cured print layer on the side face of the adhesive roll is a single-color layer. In some such embodiments, the cured print layer matches the tape backing in color. In some such embodiments, the cured print layer is of a color that contrasts with the tape backing in color. The color applied may be used to establish product identity, type, or source, and may function as trade dress or a trademark.

In some embodiments, the cured print layer on the side face of the adhesive roll has been deposited in a single pass. In some embodiments, the cured print layer on the side face of the adhesive roll has been deposited in multiple passes. In some such embodiments, the multiple passes include deposition of the same ink. In some such embodiments, the multiple passes include deposition of different inks.

In some embodiments, the cured print layer on the side face of the adhesive roll may include text, graphics, barcodes, QR codes, brand information, instructions, manufacturing information such as lot and date, expiration dates, safety information, or other information on the side face of the roll. In addition, the graphics may include remaining roll quantity indicia, which may indicate the length of tape remaining at a particular radius from the core. In some embodiments, infrared ink or microdot printing may be used to incorporate security features or hidden manufacturing information.

The methods of the present disclosure enable elimination of packaging materials by two concurrent advantages: by detackifying the side faces, it enables the elimination of packaging materials previously needed to prevent blocking of stacked rolls and accumulation of debris on the side face; and by enabling production of an adhesive tape roll bearing text, graphics, or other information on the side face of the roll, it enables the elimination of packaging materials previously needed to bear such information.

Additional embodiments are recited in the Selected Embodiments and Examples below.

SELECTED EMBODIMENTS

The following embodiments, designated by letter and number, are intended to further illustrate the present disclosure but should not be construed to unduly limit this disclosure.

M1. A method of making an adhesive tape roll having a detackified side face comprising the steps of:
  a) providing an adhesive tape roll having first and second side faces;
  b) providing an ink jet printing system; and
  c) applying one or more first inks to at least a portion of the first side face of the adhesive tape roll with the ink jet printing system.

M2. A method according to any of the previous embodiments additionally comprising the step of:
  d) curing the first ink(s) on the first side face.

M3. The method according to any of the previous embodiments additionally comprising the step of:
  e) applying one or more second inks to the second side face of the adhesive tape roll with the ink jet printing system.

M4. The method according to embodiment M3 additionally comprising the step of:
  f) curing the second ink(s) on the second side face.

M5. The method according to any of embodiments M2 or M4 wherein curing is accomplished by exposure to radiation.

M6. The method according to any of embodiments M2 or M4 wherein curing is accomplished by exposure to light in the UV to blue wavelength range.

M7. The method according to any of embodiments M2 or M4 wherein curing is accomplished by exposure to UV light having a wavelength of 245 nanometers to 405 nanometers.

M8. The method according to any of embodiments M2 or M4-M7 wherein curing step d) occurs within one minute of applying step c).

M9. The method according to any of embodiments M2 or M4-M7 wherein curing step d) occurs within ten seconds of applying step c).

M10. The method according to any of embodiments M2 or M4-M7 wherein all curing steps occur within one minute of an applying step.

M11. The method according to any of embodiments M2 or M4-M7 wherein all curing steps occur within ten seconds of an applying step.

M12. The method according to any of the previous embodiments wherein the one or more first inks are UV cure ink jet inks.

M13. The method according to any of the previous embodiments wherein the one or more first inks have a viscosity at application temperature of between 0.1 and 30.0 centipoise.

M14. The method according to any of the previous embodiments wherein the one or more first inks are acrylate inks.

M15. The method according to any of the previous embodiments wherein all inks are UV cure ink jet inks.

M16. The method according to any of the previous embodiments wherein all inks have a viscosity at application temperature of between 0.1 and 30.0 centipoise.

M17. The method according to any of the previous embodiments wherein all inks are acrylate inks.

M18. The method according to any of the previous embodiments wherein the one or more first inks comprise at least two inks that differ in opacity.

M19. The method according to any of the previous embodiments wherein the one or more first inks comprise at least two inks that differ in color.

M20. The method according to any of the previous embodiments wherein the one or more first inks comprise at least three inks that differ in color.

M21. The method according to any of the previous embodiments wherein step c) comprises applying one or more first inks to the first side face of the adhesive tape roll with the ink jet printing system in an image-wise manner so as to create text or graphics.

M22. The method according to embodiment M19 wherein the text or graphics include one or more barcodes or QR codes.

M23. The method according to any of embodiments M19-M20 wherein the text or graphics include brand information.

M24. The method according to any of embodiments M19-M21 wherein the text or graphics include manufacturing information.

M25. The method according to any of embodiments M19-M22 wherein the text or graphics include remaining roll quantity indicia.

MR1. An adhesive tape roll having a detackified side face made according to the method of any of the previous embodiments.

MR2. The adhesive tape roll according to embodiment MR1 having a first layer of cured ink directly bound to the first side face of the adhesive tape roll.

MR3. The adhesive tape roll according to embodiment MR2 wherein the first layer of cured ink comprises text or graphics.

R1. An adhesive tape roll bearing a first layer of cured ink on at least a portion of a first side face of the adhesive tape roll.

R2. An adhesive tape roll having a first layer of cured ink directly bound to a first side face of the adhesive tape roll.

R3. An adhesive tape roll according to any of embodiments R1 or R2 bearing a second layer of cured ink on a second side face of the adhesive tape roll.

R4. An adhesive tape roll according to any of embodiments R1 or R2 having a second layer of cured ink directly bound to a second side face of the adhesive tape roll.

R5. An adhesive tape roll according to any of embodiments R1-R4 wherein the first layer of cured ink comprises cured UV cure ink jet inks.

R6. An adhesive tape roll according to any of embodiments R1-R5 wherein the first layer of cured ink comprises acrylate inks.

R7. An adhesive tape roll according to any of embodiments R1-R6 wherein the first layer of cured ink comprises at least two inks that differ in opacity.

R8. An adhesive tape roll according to any of embodiments R1-R7 wherein the first layer of cured ink comprises at least two inks that differ in color.

R9. An adhesive tape roll according to any of embodiments R1-R7 wherein the first layer of cured ink comprises at least three inks that differ in color.

R10. An adhesive tape roll according to any of embodiments R1-R9 wherein the first layer of cured ink comprises text or graphics.

R11. An adhesive tape roll according to embodiment R10 wherein the text or graphics include one or more barcodes or QR codes.

R12. An adhesive tape roll according any of embodiments R10-R11 wherein the text or graphics include brand information.

R13. An adhesive tape roll according to any of embodiments R10-R12 wherein the text or graphics include manufacturing information.

R14. An adhesive tape roll according to any of embodiments R10-R13 wherein the text or graphics include remaining roll quantity indicia.

Objects and advantages of this disclosure are further illustrated by the following examples, but the particular materials and amounts thereof recited in these examples, as well as other conditions and details, should not be construed to unduly limit this disclosure.

EXAMPLES

Unless otherwise noted, all reagents were obtained or are available from Aldrich Chemical Co., Milwaukee, WI, or may be synthesized by known methods.

| Materials | |
|---|---|
| Material | Description |
| DICE Type G | Radiation-cure acrylate ink, magenta |
| Inkjet printer | Prototype and Production Systems Inc. DICElab single pass printer with a Fujifilm Starfire SG1024/SA piezoelectric inkjet print head. |
| Cure station | Open-air cure using an OmniCure AC475-395 ultraviolet LED source. |
| 3M Polyester Film Tape 850 | 0.9 mil Polyester tape with acrylic adhesive available from 3M Company, St. Paul, Minnesota. |
| 3M Performance Plus Duct Tape 8979 | Polyethylene film and cloth scrim with rubber adhesive tape available from 3M Company, St. Paul, Minnesota. |
| 3M Preservation Sealing Tape 481 | Polyethylene film with rubber adhesive tape available from 3M Company, St. Paul, Minnesota. |
| 3M VHB Heavy Duty Mounting Tape 4910 | Acrylic foam tape available from 3M Company, St. Paul, Minnesota. |
| 3M Polyester Tape 8911 | Polyester tape with silicone adhesive available from 3M Company, St. Paul, Minnesota. |
| 3M PTFE Extruded Film Tape 5491 | PTFE backing with silicone adhesive tape available from 3M Company, St. Paul, Minnesota. |
| 3M UHMW Polyethylene Tape 5421 | UHMW Polyethylene backing with rubber adhesive tape available from 3M Company, St. Paul, Minnesota. |
| 3M Glass Cloth Tape 361 | Glass cloth tape with silicone adhesive available from 3M Company, St. Paul, Minnesota. |
| 3M Polyester Tape 8905 | Polyester tape with silicone adhesive available from 3M Company, St. Paul, Minnesota. |

Test Methods

Method for Determining Separation Force of Tape Rolls

Treated and untreated tape rolls were evaluated for the separation force after conditioning. Pairs of rolls were stacked with a 5 kg weight on top. For treated rolls, the pairs of rolls were stacked with the treated side faces in contact. These were placed in an oven at 150° F. (66° C.) for 1 week. Each pair of rolls was mounted in a fixture that gripped the inside of each roll core, but allowed each roll to move independently. An Instron test bed was used to pull each pair of rolls apart and record the force required to separate the rolls, as per ASTM D882.

Qualitative Method for Determining Tackiness of Rolls

Treated and untreated rolls were evaluated for tackiness by pressing a finger against the side faces and judging the force required to remove the finger from the side faces.

Example 1

Rolls of 3M Polyester Film Tape 850 were printed with a solid pattern of magenta color Prototype & Production Systems Inc. DICE Type G Ink at 400x800 dots per inch (1016x2032 dots per centimeter) onto a side face of the finished tape roll using a Prototype & Production Systems Inc. DICElab single-pass printer with a Fujifilm Starfire SG1024/SA piezoelectric inkjet print head and then open-air cured with an OmniCure AC475-395 ultraviolet LED source. Separation force was measured in accordance with the Method for Determining Separation Force of Rolls. Three measurements were taken and averaged, resulting in a 74.5 lbf (331.4 Newton) separation force.

Comparative Example 1

Rolls of 3M Polyester Film Tape 850 were stacked on their side faces. Separation force was measured in accordance with the Method for Determining Separation Force of Rolls. Four measurements were taken and averaged, resulting in a 172.3 lbf (766.4 Newton) separation force.

Example 2

Rolls of 3M Performance Plus Duct Tape 8979 were printed with a solid pattern of magenta color Prototype & Production Systems Inc. DICE Type G Ink at 400x800 dots per inch (1016x2032 dots per centimeter) onto a side face of the finished tape roll using a Prototype & Production Systems Inc. DICElab single-pass printer with a Fujifilm Starfire SG1024/SA piezoelectric inkjet print head and then open-air cured with an OmniCure AC475-395 ultraviolet LED source. Separation force was measured in accordance with the Method for Determining Separation Force of Rolls. Three measurements were taken and averaged, resulting in a 66.8 lbf (297.1 Newton) separation force.

Comparative Example 2

Rolls of 3M Performance Plus Duct Tape 8979 were stacked on their side faces. Separation force was measured in accordance with the Method for Determining Separation Force of Rolls. Three measurements were taken and averaged, resulting in a 156.5 lbf (696.1 Newton) separation force.

The FIGURE is a photograph of a tape roll where the visible side face was treated according to one embodiment of the present disclosure, as described in Example 2 (on the right); and an untreated tape roll of the same type, as described in Comparative Example 2 (on the left). The FIGURE illustrates one embodiment of a roll of adhesive tape imparted with a distinctive color scheme, which can be arbitrarily selected, during the detackification method of the present disclosure.

Example 3

Rolls of 3M Preservation Sealing Tape 481 were printed with a solid pattern of magenta color Prototype & Production Systems Inc. DICE Type G Ink at 400x800 dots per inch (1016x2032 dots per centimeter) onto a side face of the finished tape roll using a Prototype & Production Systems Inc. DICElab single-pass printer with a Fujifilm Starfire SG1024/SA piezoelectric inkjet print head and then open-air cured with an OmniCure AC475-395 ultraviolet LED source. Separation force was measured in accordance with the Method for Determining Separation Force of Rolls. Three measurements were taken and averaged, resulting in a 43.1 lbf (191.7 Newton) separation force.

Comparative Example 3

Rolls of 3M Preservation Sealing Tape 481 were stacked on their side faces. Separation force was measured in accordance with the Method for Determining Separation Force of Rolls. Three measurements were taken and averaged, resulting in a 69.4 lbf (308.7 Newton) separation force.

Table 1 illustrates the reduction in edge tack achieved in Examples 1-3.

TABLE 1

| Sample | Separation Force (pound-force) | Separation Force (Newton) | Separation Force vs. Comparative |
|---|---|---|---|
| Example 1 | 74.5 | 331.4 | 43% |
| Comparative Example 1 | 172.3 | 766.4 | 100% |
| Example 2 | 66.8 | 297.1 | 43% |
| Comparative Example 2 | 156.5 | 696.1 | 100% |
| Example 3 | 43.1 | 191.7 | 62% |
| Comparative Example 3 | 69.4 | 308.7 | 100% |

Example 4

One roll of 3M VHB Heavy Duty Mounting Tape 4910 was printed on a side face with a solid pattern of magenta color Prototype & Production Systems Inc. DICE Type G Ink at 400x800 dots per inch (1016x2032 dots per centimeter) onto the side face of the finished tape roll using a Prototype & Production Systems Inc. DICElab single-pass printer with a Fujifilm Starfire SG1024/SA piezoelectric inkjet print head and then open-air cured with an OmniCure AC475-395 ultraviolet LED source. Treatment effectiveness was evaluated by judging the tackiness of the two sides by finger and was found to be significantly reduced on the treated side.

Example 5

One roll of 3M Polyester Tape 8911 was printed on a side face with a solid pattern of magenta color Prototype & Production Systems Inc. DICE Type G Ink at 400x800 dots per inch (1016x2032 dots per centimeter) onto the side face of the finished tape roll using a Prototype & Production Systems Inc. DICElab single-pass printer with a Fujifilm Starfire SG1024/SA piezoelectric inkjet print head and then open-air cured with an OmniCure AC475-395 ultraviolet LED source. Treatment effectiveness was evaluated by judging the tackiness of the two sides by finger and was found to be significantly reduced on the treated side.

Example 6

One roll of 3M PTFE Extruded Film Tape 5491 was printed on a side face with a solid pattern of magenta color Prototype & Production Systems Inc. DICE Type G Ink at 400x800 dots per inch (1016x2032 dots per centimeter) onto the side face of the finished tape roll using a Prototype & Production Systems Inc. DICElab single-pass printer with a Fujifilm Starfire SG1024/SA piezoelectric inkjet print head and then open-air cured with an OmniCure AC475-395 ultraviolet LED source. Treatment effectiveness was evaluated by judging the tackiness of the two sides by finger and was found to be significantly reduced on the treated side.

Example 7

One roll of 3M UHMW Polyethylene Tape 5421 was printed on a side face with a solid pattern of magenta color Prototype & Production Systems Inc. DICE Type G Ink at 400x800 dots per inch (1016x2032 dots per centimeter) onto the side face of the finished tape roll using a Prototype & Production Systems Inc. DICElab single-pass printer with a Fujifilm Starfire SG1024/SA piezoelectric inkjet print head and then open-air cured with an OmniCure AC475-395 ultraviolet LED source. Treatment effectiveness was evaluated by judging the tackiness of the two sides by finger and was found to be significantly reduced on the treated side.

Example 8

One roll of 3M Glass Cloth Tape 361 was printed on a side face with a solid pattern of magenta color Prototype & Production Systems Inc. DICE Type G Ink at 400x800 dots per inch (1016x2032 dots per centimeter) onto the side face of the finished tape roll using a Prototype & Production Systems Inc. DICElab single-pass printer with a Fujifilm Starfire SG1024/SA piezoelectric inkjet print head and then open-air cured with an OmniCure AC475-395 ultraviolet LED source. Treatment effectiveness was evaluated by judging the tackiness of the two sides by finger and was found to be significantly reduced on the treated side.

Example 9

One roll of 3M Polyester Tape 8905 was printed on a side face with a solid pattern of magenta color Prototype & Production Systems Inc. DICE Type G Ink at 400x800 dots per inch (1016x2032 dots per centimeter) onto the side face of the finished tape roll using a Prototype & Production Systems Inc. DICElab single-pass printer with a Fujifilm Starfire SG1024/SA piezoelectric inkjet print head and then open-air cured with an OmniCure AC475-395 ultraviolet LED source. Treatment effectiveness was evaluated by judging the tackiness of the two sides by finger and was found to be significantly reduced on the treated side.

Example 10 (Prophetic)

Example 1 is repeated, except that two inks are applied image-wise to a side face of the roll by the piezoelectric inkjet print head to create an adhesive tape roll bearing graphics on the detackified side face.

Example 11 (Prophetic)

Example 1 is repeated, except that six inks are applied image-wise to a side face of the roll by the piezoelectric inkjet print head to create an adhesive tape roll bearing full color graphics on the detackified side face.

Various modifications and alterations of this disclosure will become apparent to those skilled in the art without departing from the scope and principles of this disclosure, and it should be understood that this disclosure is not to be unduly limited to the illustrative embodiments set forth hereinabove.

We claim:

1. A method of making an adhesive tape roll having a detackified side face comprising:
providing an adhesive tape roll having first and second side faces;
providing an ink jet printing system; and
applying one or more first inks to at least a portion of the first side face of the adhesive tape roll with the ink jet printing system.

2. A method of claim 1 additionally comprising:
curing the first ink(s) on the first side face.

3. The method of claim 1 additionally comprising:
applying one or more second inks to at least a portion of the second side face of the adhesive tape roll with the ink jet printing system.

4. The method of claim 3 additionally comprising:
curing the second ink(s) on the second side face.

5. The method of claim 2, wherein curing is accomplished by exposure to light in the UV to blue wavelength range.

6. The method of claim 2, wherein the curing step occurs within 10 seconds of the applying step.

7. The method of claim 1, wherein the one or more first inks are UV cure ink jet inks having a viscosity at application temperature of between 0.1 and 30.0 centipoise.

8. The method of claim 1, wherein the one or more first inks comprise at least two inks that differ in opacity or color.

9. The method of claim 1, wherein the applying step comprises applying one or more first inks to the first side face of the adhesive tape roll with the ink jet printing system in an image-wise manner so as to create a pattern, text or graphics.

10. The method of claim 9, wherein the text or graphics include one or more of: barcodes, QR codes, brand information, manufacturing information, or remaining roll quantity indicia.

* * * * *